US009366520B2

(12) United States Patent
Puchegger

(10) Patent No.: US 9,366,520 B2
(45) Date of Patent: Jun. 14, 2016

(54) DEVICE FOR MEASURING SURFACE DIMENSIONS OF AN OBJECT

(75) Inventor: Alfred Puchegger, Krumbach (AT)

(73) Assignee: Puchegger u. Jilg Parkett Groβ u. Einzelhandels Ges.m.b.H., Krumbach (AT)

(*) Notice: Subject to any disclaimer, the term of this patent is extended or adjusted under 35 U.S.C. 154(b) by 255 days.

(21) Appl. No.: 13/980,990

(22) PCT Filed: Feb. 13, 2012

(86) PCT No.: PCT/AT2012/000026
§ 371 (c)(1),
(2), (4) Date: Jul. 22, 2013

(87) PCT Pub. No.: WO2012/116381
PCT Pub. Date: Sep. 7, 2012

(65) Prior Publication Data
US 2013/0305509 A1   Nov. 21, 2013

(30) Foreign Application Priority Data
Mar. 1, 2011  (AT) ...................................... 270/2011

(51) Int. Cl.
G01B 5/02 (2006.01)
G01B 3/10 (2006.01)
G01B 5/004 (2006.01)
G01B 7/004 (2006.01)

(52) U.S. Cl.
CPC ................ *G01B 5/02* (2013.01); *G01B 3/1071* (2013.01); *G01B 3/1084* (2013.01); *G01B 5/004* (2013.01); *G01B 7/004* (2013.01); *G01B 2003/1092* (2013.01); *Y10T 29/49771* (2015.01)

(58) Field of Classification Search
CPC ................... G01B 3/10; G01B 3/1084; G01B 2003/1089; G01B 3/1041; G01B 3/1071
USPC .................................................. 33/755–771
See application file for complete search history.

(56) References Cited

U.S. PATENT DOCUMENTS

| 4,500,749 | A | | 2/1985 | Khoshnevis |
| 5,004,870 | A | | 4/1991 | Osborn |
| 5,743,021 | A | * | 4/1998 | Corcoran ............. G01B 3/1005 33/762 |
| 5,782,007 | A | | 7/1998 | Harris |
| 6,381,863 | B1 | * | 5/2002 | Steinich ............... G01B 3/1002 33/756 |

(Continued)

FOREIGN PATENT DOCUMENTS

EP   2 175 401 A1   2/2010

OTHER PUBLICATIONS

International Search Report mailed Apr. 27, 2012; PCT/AT2012/000026.

*Primary Examiner* — Yaritza Guadalupe-McCall
(74) *Attorney, Agent, or Firm* — Ladas & Parry LLP

(57) ABSTRACT

The invention relates to a device for measuring surface dimensions of an object, comprising an elongate flexible material piece, which is supported on a roller in such a way that the material piece can be unwound and on the end of which a probe is provided, wherein the roller is connected to a base of the device in such a way that the roller can be rotated about a vertical axis, and wherein two sensors are provided, by means of which the unwound length of the material piece and the angle of the roller with respect to the base can be detected, wherein the base consists of a planar bottom plate and the roller is arranged on the side facing away from the contact surface of the bottom plate.

11 Claims, 2 Drawing Sheets

(56) References Cited

U.S. PATENT DOCUMENTS

Figure 1:
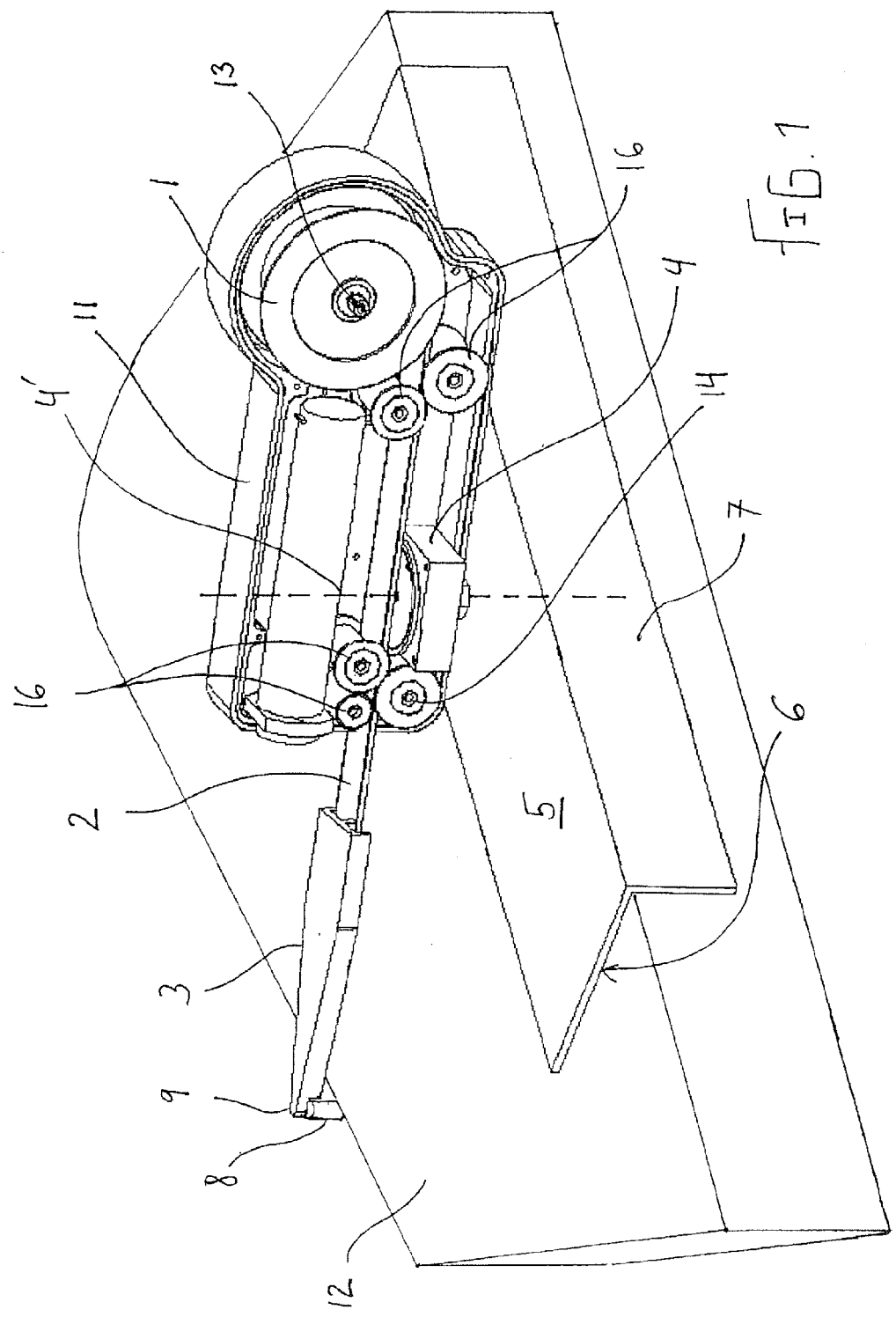

| | | | | |
|---|---|---|---|---|
| 6,499,225 B1 * | 12/2002 | Steinich | ............... | G01B 3/11 33/756 |
| 6,543,152 B1 * | 4/2003 | Steinich | ............ | B65H 75/4442 33/733 |
| 6,694,861 B2 * | 2/2004 | Glasson | ............ | F15B 15/283 33/763 |
| 6,785,973 B1 | 9/2004 | Janssen | | |
| 7,197,974 B2 * | 4/2007 | Glasson | ............ | F15B 15/283 33/763 |
| 7,401,416 B2 * | 7/2008 | Brooks | ............. | G01B 3/1084 33/630 |
| 2005/0034320 A1 * | 2/2005 | Connor | ............. | G01B 3/1061 33/760 |
| 2008/0052943 A1 * | 3/2008 | Brooks | ............. | G01B 3/1084 33/760 |
| 2008/0120863 A1 * | 5/2008 | Haglof | ............. | G01B 3/1041 33/767 |
| 2009/0056159 A1 * | 3/2009 | Plucknett | ............ | G01B 3/1084 33/760 |
| 2010/0325909 A1 * | 12/2010 | Fratti | ............. | G01B 3/1082 33/707 |
| 2013/0305509 A1 * | 11/2013 | Puchegger | .......... | G01B 3/1071 33/761 |
| 2014/0250708 A1 * | 9/2014 | Bauer | ............ | G01B 3/1061 33/760 |

* cited by examiner

DEVICE FOR MEASURING SURFACE DIMENSIONS OF AN OBJECT

The invention relates to a device for measuring surface dimensions of an object, having an elongated flexible material piece that can be unrolled, supported on a roller, on the end of which a probe is provided, wherein the roller is connected to a base of the device such that it can rotate about a vertical axis, and wherein two sensors are provided, by means of which the unrolled section of the material piece, and the angle of the roller in relation to the base can be detected.

EP 2 157 401 A1 shows a device for measuring the dimensions of objects in three spatialdimensions. For this, the outline of the object is scanned using a handheld probe. The probe is connected to a base device by means of a cord that is kept taut, which can measure the length of the unrolled cord as well as the angle of the cord in relation to the base device. The cord roll is located in the base device, and exits said device via a ball-and-socket joint. Sensors on the ball-and-socket joint measure the current alignment in two degrees of freedom. A spatial coordinate is calculated from the three data obtained thereby. This device is also suitable for measurements in two spatial dimensions, but it should be noted that the mechanism of the ball-and-socket joint is quite sophisticated, in order to minimize measurement errors. The disadvantage is that the measurement of two-dimensional objects is not justified by the structural expenditure.

U.S. Pat. No. 6,785,973 B1 discloses a device for measuring the dimensions of two-dimensional objects, wherein, with the known device, a ball-and-socket joint is replaced by a simple, swivel joint with a vertical axis. A cord with a probe is extended by means of a cantilever arm. Thus, only an angle of the probe in relation to the device can be determined (see FIG. 1 of the U.S. Pat. No. 6,785,973 B1). The disadvantage of this solution is that the plane in which the cantilever arm is located is distanced from the surface of the object that is to be measured. If, for example, the device is located on the surface of the object that is to be measured, then the probe must be guided downward to this surface, which, although it is possible, due to the flexibility of the cord, can lead, however to a measurement error.

The invention is aimed at creating a device of the type described in the introduction, which enables the measurement of surfaces with little error, and which is constructed in a simple and robust manner, as well as being reasonably priced. The device according to the invention is distinguished in that the base consists of a base plate, and the roll is disposed on the side of the base plate facing away from the supporting surface.

A preferred embodiment of the invention is distinguished in that a pre-tensioning means, preferably a spring, is provided, which exerts a force on the elongated flexible material piece, for winding it onto the roller.

In one embodiment of the invention, the elongated flexible material piece is a tape measure.

In another embodiment of the invention, the roller is supported on a pivot mounted arm, by means of which the axis of the roller can be repeatedly moved toward the base.

For a further development of the invention, the base plate exhibits a stop angle for aligning the device with an edge of an object.

In another design of the invention, the probe is designed as a handpiece, wherein the probe preferably exhibits a pointed tip. For this, the tip of the probe can be designed as a ball bearing mounted scanning roller, the roller axis of which runs parallel to the vertical axis of the device.

In another embodiment of the invention, the vertical axis runs through a releasable, preferably magnetic, bearing block connected to the base plate.

According to another design of the invention, at least one of the sensors is a magnetic sensor.

It is preferred that the device according to the invention can be controlled by means of a remote control.

It is furthermore preferred that the device exhibits a transmitting means, preferably an electronic transmitting means, in particular, a Bluetooth transmitter, by means of which the measurements are sent directly to a processing unit.

The invention also relates to a system for measuring surface dimensions of an object, comprising a device according to the invention and a computer, wherein a communication connection can be established between the device and the computer.

The invention aims to create a method for producing a covering for staircases. It should enable, in a quick and simple manner, the coverings for staircases having customized surface dimensions.

The method according to the invention is obtained by means of the steps: measurement of the surface dimensions of the staircase step by means of the device according to the invention; transmission of the data from the surface measurement to a processing unit; production of the covering for the staircase in accordance with the transmitted data.

Figure 2:
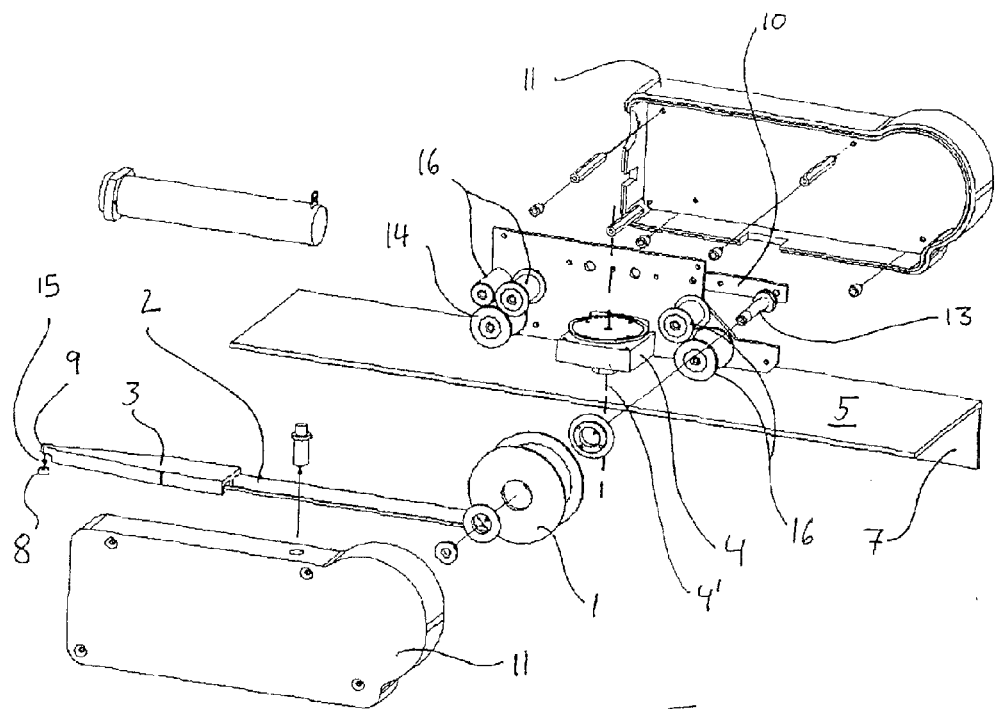

The invention shall be explained below in greater detail, based on an embodiment example depicted in the drawings. They show:

FIG. 1: a perspective overall view of the device on a workpiece that is to be measured;

FIG. 2: an exploded depiction of the components of the device.

The device for measuring the surface dimensions of an object is placed, in accordance with FIG. 1, with its base on a surface of the object 12 that is to be measured. The surface can be an arbitrarily shaped plate or surface of an arbitrary object exhibiting sufficient rigidity. The object 12 can exhibit an edge outline, a plotted line to be measured, or no shape definition at all. The measurement precision is increased, however, if the surface exhibits very few irregularities. In the following, the measurement procedure shall be portrayed using the example of a plate shaped object 12 having an edge outline, as is depicted in FIG. 1.

A rotatably supported housing 11 is located on the base 5, in which a roller 1 is located, having a coiled flexible material piece 2 that can be unrolled. A probe 3 is located on the end of the material piece 2 located outside of the housing 11, which can, for example, be drawn away from the housing 11 by hand, wherein the material piece 2 is unrolled from the roller 1. When the probe 3 again approaches the housing 11, the material piece is rolled onto the roller 1 by means of a pre-tensioning agent. The maximum unrolled length of the material piece can amount to two meters or more, for example. A system comprising a roller 1, material piece 2, probe 3 and the pre-tensioning agent is known, for example, in conventional metal measuring tapes.

The roller 1 is disposed in a rotatable manner via the housing 11 on the base 5. The rotation occurs via a vertical axis 4' of a bearing block 4, which stands as close to vertical as possible on the base 5 and surface during the measurement of the surface. In the example shown in FIG. 1, the vertical axis 4' consists of a cubical bearing, which can be permanently attached to the housing 11.

If the probe 3 is then guided along an arbitrary outline of the surface of the object 12, the roller 1 rotates about the vertical axis 4' such that a direct connection between the probe 3 and the roller 1 is always present; in addition, the material piece 2 always unrolls as far away from the roller 1, or onto it, such that it is stretched tightly between the probe 3 and the roller 1. In the course of following the surface outline with the probe 3, two coordinates are thus generated: the angle of the roller 1, or the housing 11, respectively, in relation to the base 4 and the unrolled section of the material piece 2 in relation to the angle. These two coordinates are detected electronically by means of sensors in the housing 11, and can be translated by a computer into surface map. Without any great effort, such as is the case, for example, with a measurement carried out by hand, measurements of steep angles, or customized curvatures are detected in the surface planes. The measurement is completed when the outline has been followed and the generated data have been evaluated.

It is advantageous if the axis 13 of the roller 1 is perpendicular to the vertical axis 4', in order that no variable oblique angles occur when the material piece 2 is unrolled, which would compromise the measurement precision. In the embodiment shown in FIG. 1, this applies in a like manner to the axis of the guide roller 14, because the guide roller 14 determines the alignment at which the material piece 2 exits the housing 11.

FIG. 2 shows the components of an alternative embodiment of the device in an exploded depiction. The roller 1 is supported here on a swivel arm 10. As a result, the axis 13 of the roller 1 can be lowered. This is due to the fact that the material piece 2, in increasingly unrolled sections, is more strongly drawn from the center of the roller 1 than from its circumference toward the guide roller 14. Even the provided additional centering rollers 16 are guided toward the material piece 2 from a variable angle away from the roller 1, to the extent that said roller does not move toward the base as the unrolled section increases. If the material piece 2 is released, either during or after the measurement, it winds back onto the roller 1, which then returns upward on the swivel arm 10, i.e. away from the base. Correspondingly more space is to be left in the housing, with this embodiment, for the moving roller 1.

In order to facilitate the manipulation and in order to increase the measurement precision, the probe tip 9 exhibits a scanning roller 8. As a result, the probe can be pressed against the outline of the object 12 in a rolling manner. Measurement imprecisions as a result of a slipping probe 3 are eliminated thereby. The axis of rotation 15 for the scanning roller 8 runs parallel to the vertical axis 4' for the purpose of further increasing the measurement precision.

In addition, the base 5 can exhibit a stop angle 7. This leads to a more solid seating of the base during the measurement of objects, which exhibit at least a sufficiently long straight edge. Such objects can be, for example, staircases, which each exhibit a unique size after installation in a stairway, but also exhibit a straight step edge. A more solid seating of the base 5 is a prerequisite for a precise measurement.

The electronic sensors within the housing 11 measure the angle of the housing 11 in relation to the base and the unrolled section of the material piece 2. Sensors are known from the prior art, such as magnetic sensors, which generate electronic signals without a mechanical expenditure, which can be processed electronically.

The measurement values can be transmitted to an external receiver via a radio link. This receiver can be a computer, which computes an outline design from the temporal course of the measurement value pairs (angle of the housing 11 and unrolled section of the material piece 2). Typical methods can be used for the radio link, such as Bluetooth, infrared, etc.

A radio link to the device can also be used for remote control thereof. By means of the remote control, the temporal measurement start and the measurement end, for example, can be initiated.

In order to improve the manipulation and the measurement precision, problematic areas of an object outline can be traced repeatedly with the probe 3. The evaluation program then receives numerous unrolling lengths of the material piece 2 for a specific angle region, and can calculate a mean value for this, or—depending on the requirements—the maximum or minimum value.

In order to facilitate transportation of the device, the housing 11 can be separated from the base 5. This separation can be attained, for example, in that the bearing block 4 containing the vertical axis 4' is attached magnetically to the base 5. The bearing block 4 is then connected in a fixed manner to the base 5 during the measurement, but can be readily released from the base 5 after the measurement by tilting the housing 11.

It is to be understood that the embodiment examples portrayed in the scope of the invention concept can be varied in different manners, e.g. with respect to the material piece, which can also be a steel cable or similar item, as well as with respect to the pre-tensioning means or the sensors.

The invention claimed is:

1. A device for measuring surface dimensions of an object, having an elongated flexible material piece that can be unrolled, supported on a roller, on the end of which a probe is provided, wherein the roller is connected to a base of the device such that it can rotate about a vertical axis, and wherein two sensors are provided, by means of which the unrolled section of the material piece and the angle of the roller in relation to the base can be detected, characterized in that the base consists of a flat base plate, and the roller is disposed on the surface of the base plate facing away from the supporting surface, wherein the roller is connected to a base of the device such that it can rotate about a vertical axis, and wherein the roller is supported on a swivel arm, by means of which the axis of the roller can be repeatedly moved toward the base.

2. The device according to claim 1, characterized in that a pre-tensioning means, preferably a spring, is provided, with which a force is exerted on the elongated flexible material piece for winding it onto the roller.

3. The device according to claim 1, wherein the elongated flexible material piece is a tape measure.

4. The device according to claim 1, wherein the base plate exhibits a stop angle for aligning the device with an edge of an object.

5. The device according claim 1, wherein the probe is designed as a handpiece.

6. The device according to claim 1, wherein the probe exhibits a pointed tip.

7. The device according to claim 6, wherein the tip of the probe is designed as a ball bearing mounted scanning roller, the roller axis of which runs parallel to the vertical axis of the device.

8. The device according to claim 1, wherein the vertical axis runs through a releasable, preferably magnetic, bearing block connected to the base plate.

9. The device according to claim 1, wherein at least one of the sensors is a magnetic sensor.

10. The device according to claim 1, wherein the device can be controlled with a remote control.

11. The device according to claim 1, wherein the device exhibits a transmitting means, preferably an electronic transmitting means, in particular a Bluetooth transmitter, with which the measurement values can be transmitted to a processing unit.

* * * * *